United States Patent [19]

Pittman et al.

[11] Patent Number: 4,639,261

[45] Date of Patent: Jan. 27, 1987

[54] HIGH EFFICIENCY AIR FILTER

[75] Inventors: Clarence B. Pittman, Pinetown; George H. Cadwell, Jr., Blounts Creek, both of N.C.

[73] Assignee: Flanders Filters, Inc., Washington, N.C.

[21] Appl. No.: 584,819

[22] Filed: Feb. 29, 1984

[51] Int. Cl.$^4$ .............................................. B01D 46/52
[52] U.S. Cl. ....................... 55/502; 55/483; 55/484; 55/505; 55/521; 156/329
[58] Field of Search ................. 55/502, 521, 497, 505, 55/355, 483, 484; 277/DIG. 6; 528/901; 156/329

[56] References Cited

U.S. PATENT DOCUMENTS

| | | | |
|---|---|---|---|
| Re. 27,701 | 7/1973 | Allan, Jr. et al. | 55/502 X |
| 3,486,311 | 12/1969 | Allan, Jr. | 55/502 X |
| 3,843,764 | 10/1974 | Grawey et al. | 156/329 X |
| 3,870,490 | 3/1975 | Landy | 55/502 X |
| 3,986,850 | 10/1976 | Wilcox | 55/355 |
| 4,082,525 | 4/1978 | Allan | 55/502 X |
| 4,216,140 | 8/1980 | Simizu | 528/901 X |
| 4,233,044 | 11/1980 | Allan | 55/502 X |

OTHER PUBLICATIONS

The Condensed Chemical Dictionary, 10th ed. New York, Van Nostrand Reinhold, 1981, pp. 921–922.

*Primary Examiner*—Kathleen J. Prunner
*Attorney, Agent, or Firm*—Bell, Seltzer, Park & Gibson

[57] ABSTRACT

A high efficiency particulate air filter is disclosed which has a channel formed in the front peripheral surface thereof, with the channel being substantially filled with a sealant which comprises an essentially non-volatile and non-hardening gum-like material. The physical properties of the sealant render the sealant able to effect sealing engagement with a mating flange mounted in the filter housing, and also permit the flange to be withdrawn from the sealant without an appreciable amount of the sealant adhering to the flange, to thereby avoid the build up of potentially contaminated sealant on the flange when the filter is changed. A method of fabricating the filter is also disclosed, which results in the sealant forming a substantially uniform and continuous closed strip which is characterized by the absence of a butt end joint.

8 Claims, 12 Drawing Figures

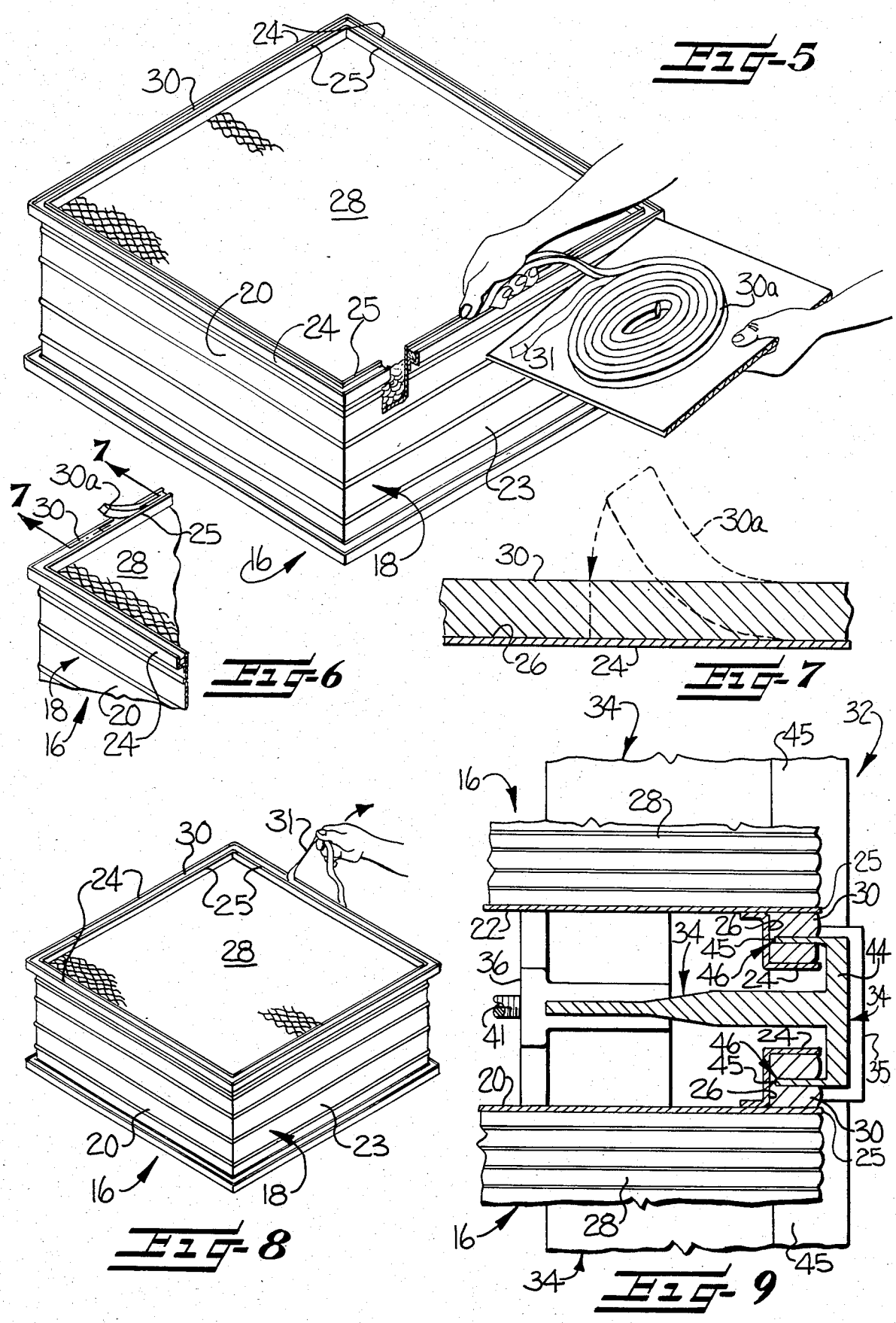

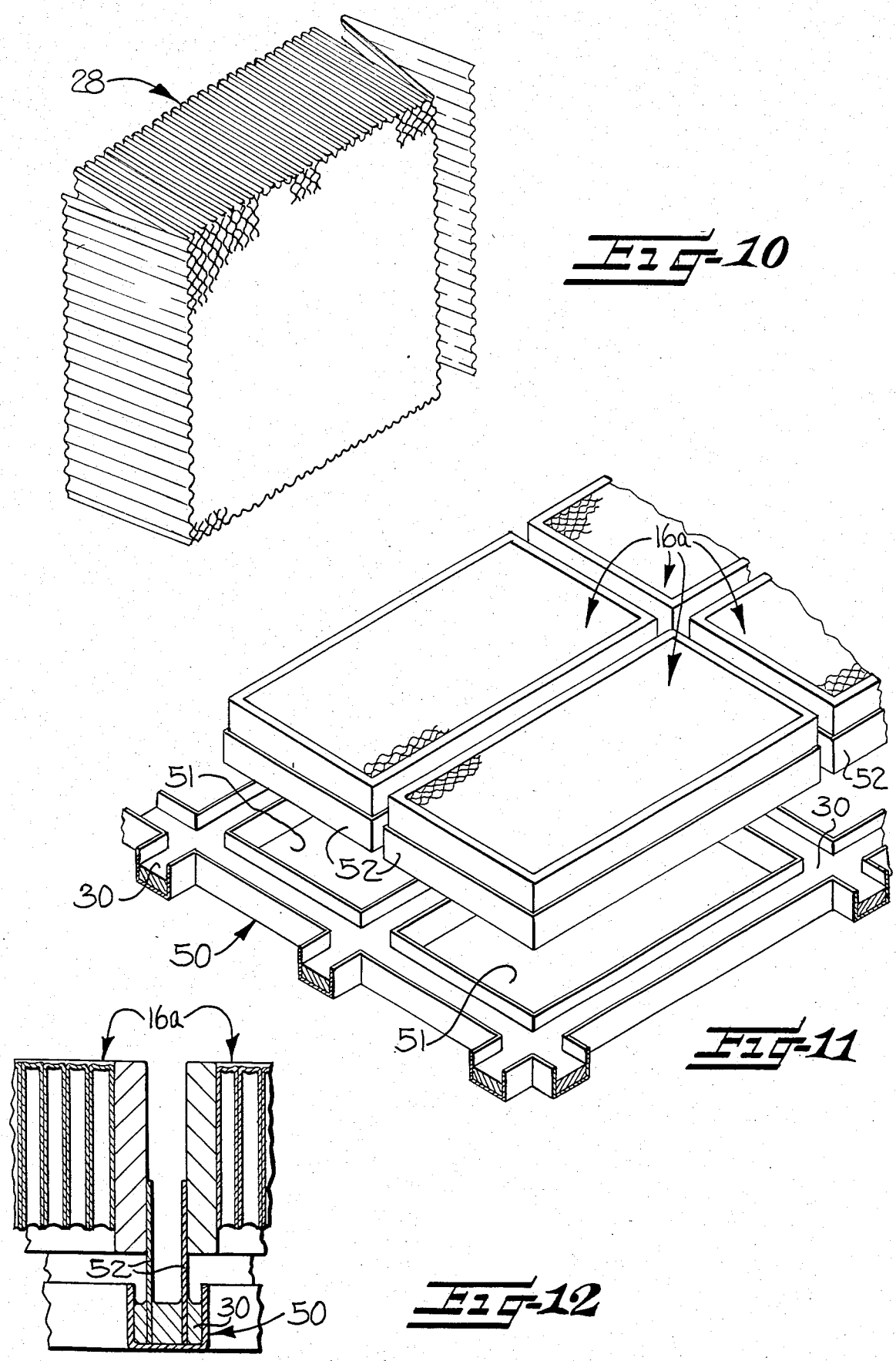

HIGH EFFICIENCY AIR FILTER

The present invention relates to a high efficiency particulate air filter, and means for sealing the filter in a supporting housing or the like.

High efficiency particulate air filters (often referred to as HEPA or absolute filters) are presently widely used in a number of different industrial, research and hospital applications. For example, such filters are commonly used in conventional air handling systems to provide essentially particle free air to laboratories and critical manufacturing areas. In the case of clean rooms and other environmentally controlled enclosures, high efficiency filters are adapted to provide a clean supply of air under laminar flow conditions throughout the full area of the room.

High efficiency filters are also used for the collection and containment of harmful materials, such as potentially radioactive substances, dangerous viable organisms, or carcinogenic or toxic materials. Thus for example, in the case of a nuclear power generating facility, it is common to direct the exhaust of the cooling air system through one or more banks of filters to preclude the release of potentially radioactive materials into the atmosphere.

In a conventional filter installation, each individual filter is mounted in a surrounding housing or holding framework. A gasket of neoprene rubber or other similar material is secured to the front periphery of the filter frame, and is designed to contact an inwardly turned peripheral flange in the housing. A suitable clamping mechanism is then provided to press the filter frame and its front gasket against the flange to prevent leakage of air around the outside of the filter. Such gasket seals have proven to be unsatisfactory in many applications however, since unfiltered air leaks often develop across the gasket, or at the butt joint of the gasket.

The commonly owned prior U.S. Pat. No. Re. 27,701 and U.S. Pat. No. 4,233,044 disclose a high efficiency particulate air filter of the above described type which utilizes a fluid of high consistency to seal the filter in a supporting housing, as opposed to the leakage prone gasket seals. More particularly, the filter as described in those patents has a continuous channel formed in the front periphery of the frame, and a fluid having a consistency substantially the same as that of household petrolatum is disposed in the channel. The fluid filled channel is adapted to sealably receive a mating retaining flange mounted in the housing, with the retaining flange being embedded in the fluid to seal the filter in assembled relation therein. In commercial practice, the fluid has comprised a silicone base grease having a viscosity of about 30,000 centipoise.

The fluid sealing structure of the above patents represents a vast improvement over the previously employed gasket seals, and has met with a great deal of commercial success since a near perfect and nondeteriorating seal is achieved under normal operating conditions. However, in certain instances where the fluid sealed filter is utilized for the collection and containment of harmful materials as noted above, the presence of the fluid in the air filtration system has been a source of concern. More particularly, it has been feared that the harmful materials may contaminate the fluid, and that a portion thereof may adhere to and remain on the surfaces of the mating retaining flange in the housing as contaminated residue after the periodic replacement of the filters. As will be readily apparent, the build-up of a potentially contaminated residue in the housing could result in a substantial safety hazard. Also, under certain unusual operating conditions, the fluid sealant tends to dry out, which can in time result in cracks and leaks, and further, the drying out (or out-gassing) may result in undesirable gases being introduced into the filtered airstream.

It is accordingly an object of the present invention to provide a high efficiency air filter which is adapted to provide an essentially leak proof and nondeteriorating seal with its supporting housing or framework.

It is a further object of the invention to provide a high efficiency air filter which insures that substantially all contaminated materials are collected and removed from the housing upon each change of the filter, with substantially none of the sealant adhering to the mating flange of the housing.

It is another object of the present invention to provide a high efficiency air filter which substantially alleviates the problems associated with the drying out of the sealant, and out-gassing from the sealant, as noted above.

It is a further object of the present invention to provide an efficient method of fabricating a high efficiency filter of the described type, and with the resulting filter having the above novel features and advantages.

These and other objects and advantages of the present invention are achieved in the embodiment illustrated herein by the provision of a high efficiency air filter which comprises a frame having a centrally disposed air flow opening therethrough, and with the frame including a continuous peripheral channel adjacent one end thereof. A filter pack is sealably disposed within the frame so as to fill the air flow opening therethrough, and a sealant is disposed to substantially fill the channel, with the sealant comprising an essentially non-volatile and non-hardening gum-like plastic material having a consistency substantially the same as modeling clay. In a preferred embodiment, the sealant comprises an uncured polysiloxane gum having a viscosity of at least about 500,000 centipoise. By reason of the unique physical properties of such a sealant, the filter is adapted to be sealed in a housing having a flange conforming to the channel by embedding the flange in the sealant, and the filter may be subsequently removed from the housing with the flange being withdrawn from the sealant without an appreciable amount of the sealant adhering to the flange.

To fabricate the above described filter in accordance with the present invention, the filter is initially constructed in a conventional manner and so as to include a frame, and a filter pack sealably disposed within the frame. The peripheral channel is also formed in the frame, and the sealant is extruded into an elongate strip having a cross sectional size and shape which generally corresponds to that of the channel. The strip is then progressively disposed in the channel, and is cut to length so that the trailing end of the strip abuts the initially inserted end in the channel. Surprisingly, the abutting ends will self amalgamate or diffuse into each other, resulting in a continuous joint which has the characteristics of the continuous strip. Thus the strip is characterized as having a continuous uniformity, and by the absence of a butt end joint.

Some of the objects of the invention having been stated, other objects will appear as the description proceeds, when taken in connection with the accompanying drawings, in which FIG. 1 is a fragmentary perspective view of a vertically disposed bank of filters which embodies the present invention and which is positioned within a duct forming a part of an exhaust air cleaning system or the like;

Figure 1:
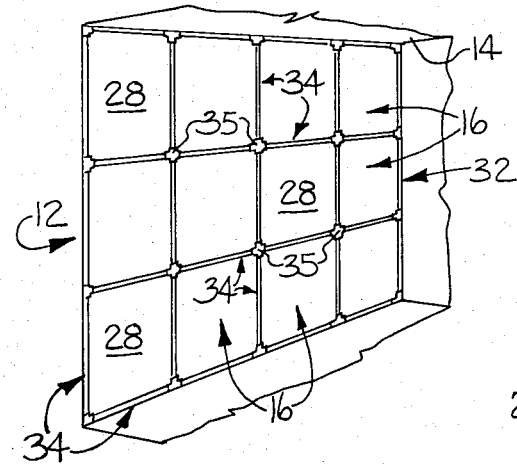
Figure 2:
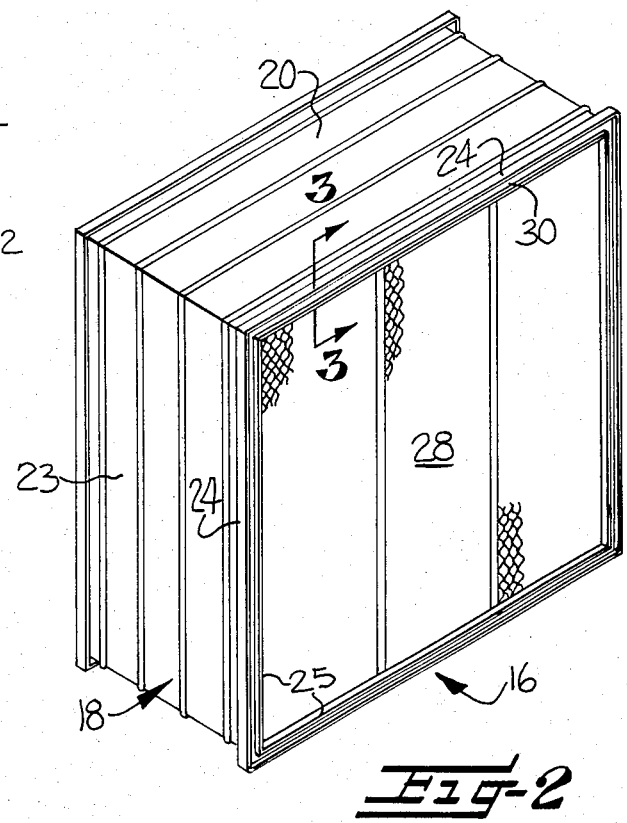
FIG. 2 is a perspective view of one of the filters employed in the bank of FIG. 1.

FIGS. 5—6 are perspective views illustrating the sequence of steps involved in the fabrication of a filter in accordance with the present invention;

FIG. 7 is an enlarged sectional view of the sealant and channel taken substantially along the line 7—7 of FIG. 6, and illustrating the self amalgamation of the butted ends of the sealant in the channel;

FIG. 8 is a perspective view illustrating an embodiment wherein the release sheet is withdrawn after the sealant is completely positioned in the channel;

FIG. 9 is a fragmentary sectional view of a portion of the supporting gridwork and associated filters in the bank of FIG. 1, and illustrating the manner in which the retaining flanges of the gridwork are received within the channels and are embedded in the sealant;

FIG. 10 is a perspective view of a folded filter pack in accordance with the present invention;

FIG. 11 is a fragmentary exploded perspective view illustrating an alternative embodiment of the invention; and FIG. 12 is a fragmentary sectional view illustrating the embodiment of FIG. 11 in assembled condition.

Referring more specifically to the drawings, FIGS. 1-4 illustrate a bank of filters 12 embodying the present invention and which is disposed in a vertical arrangement within a housing 14, such as an exhaust duct in an air cleaning system or the like. More particularly, the bank 12 comprises a plurality of individual high efficiency air filters 16 which are disposed in a side-by-side or parallel arrangement, and each filter 16 comprises a rectangular frame 18 defining a centrally disposed air flow opening therethrough. In the illustrated embodiment, the frame 18 comprises four sheet metal sides 20, 21, 22, 23, and a continuous peripheral sheet metal member 24 of angled cross-section attached to the sides by welding or the like. The sides 20-23 and member 24 cooperate to define a front peripheral surface 25 which surrounds the air flow opening, as well as a continuous U-shaped channel 26 disposed in the front surface. Typically, the filters 16 each measure 24×24×5⅞ inches, and the channel 26 has an inside width of about ⅝ inches and depth of about 11/16 inches.

A filter pack 28 is sealably disposed within the frame 18, and fills the air flow opening. Conventionally, the filter pack 28 comprises a sheet of filtering medium folded in accordion fashion as illustrated in FIG. 10, and with the folds thereof lying substantially parallel to the direction of air flow through the filter. The sheet of filtering medium may be fabricated, for example, from glass, ceramic, or cellulose asbestos. In the case of HEPA or absolute filters, the filters have extremely high dust retention characteristics, usually greater than about 95% efficiency in removing submicron sized particles from the airstream, and typically 99.97% efficiency, as measured by the conventional DOP test. A sealant 30 as further described below substantially fills the channel 26 to a level not above the front surface 25 of the frame.

To support the filters 16 in the bank 12 as shown in FIG. 1, there is provided a structural gridwork 32 of interconnected T-shaped members 34 which is fixedly mounted in the housing 14. The T-shaped members 34 may be fabricated from a suitable metallic material, such as extruded aluminum, and are interconnected in the indicated rectangular arrangement by the cross connectors 35 and junction couplings 36 which are fixedly attached to the associated T-shaped members 34 by suitable rivets or the like. By this arrangement, the T-shaped members define a plurality of rectangular open areas, with each open area receiving one of the filters. To further support the filters, a bolt assembly 38 is disposed at each of the rear corners of each filter. Each bolt assembly includes a flat plate 39 which, in most instances within the bank 12, overlies the adjacent corners of four adjacent filters in the manner apparent from FIG. 4. Also, each assembly 38 includes a nut 40 which is adapted to threadedly engage the bolt 41 attached to each junction coupling 36 to thereby releasably retain the filters on the gridwork as hereinafter further described.

The T-shaped members 34 further comprise a forward cross bar 44 and a rearwardly directed flange 45 carried along each side of the cross bar. The four flanges 45 thus disposed within each open area of the gridwork define (together with a portion of the cross connectors 35) a continuous, four-sided retaining flange 46 which has a cross-sectional outline corresponding to that of the channel 26 in the frame of the associated filter. In this regard, it will be understood that the members 34 about the periphery of the bank 12 have an L-shaped cross section as opposed to a T-shaped configuration, and thus have only one flange 45 associated therewith, and that these peripheral members may be sealably connected to the walls of the housing 14 by means of a suitable mastic sealant or the like.

Figure 4:
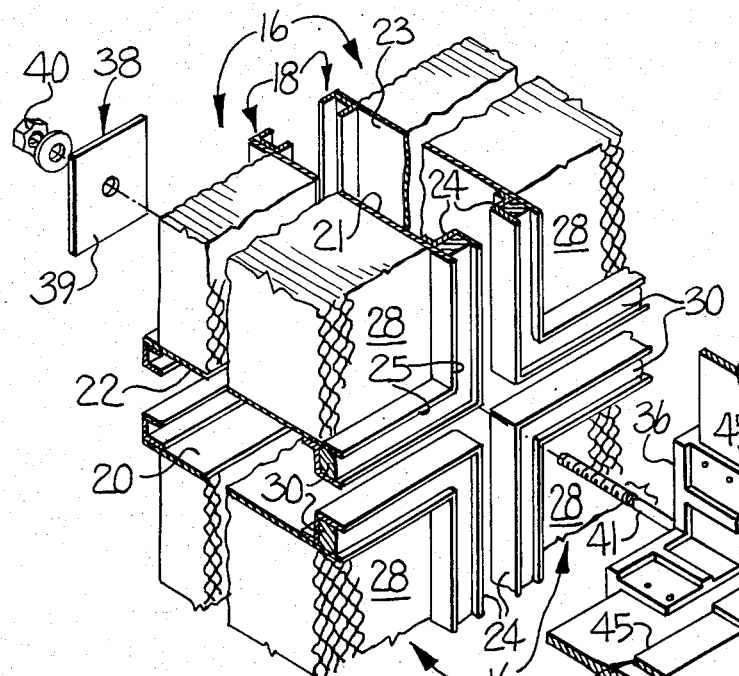
FIG. 4 is a fragmentary exploded perspective view illustrating the manner in which the filters are assembled to the supporting gridwork in the bank of FIG. 1.
Figure 3:
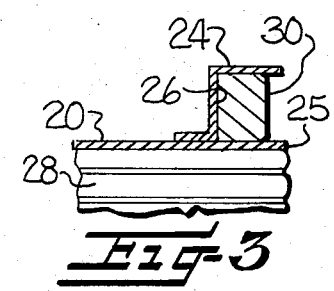
FIG. 3 is a fragmentary sectional view taken substantially along the line 3—3 of FIG. 2.

In use, the filters 16 are initially assembled onto the gridwork 32 by positioning each filter in one of the openings, and in an adjacent face to face relationship with the associated retaining flange 46 as indicated in FIG. 4. In this position, the filter rests upon the surface of the lower junction couplings 36, which serve to support the weight thereof. The filter is then translated forwardly toward the retaining flange 46 such that the flange is embedded within the sealant 30 of the channel 26 to effect a seal between the filter 16 and gridwork 32, note FIG. 9. To more permanently hold the filter in its assembled position, a bolt assembly 38 is connected at each of the four rear corners of the filter.

Upon termination of the useful life of the filters, which can vary from a matter of days to several years depending upon the nature of the airstream to which they are subjected, each filter is removed by releasing the bolt assemblies 38 and rearwardly translating the filter. A new filter may then be installed in each opening in the manner described above.

In accordance with the present invention, the sealant 30 comprises an essentially non-volatile and non-hardening gum-like material. The material preferably comprises an uncured high molecular weight silicone gum which is in a highly viscous plastic state as opposed to a predominately elastic state achieved by cross-linking or curing, and the material is moldable and has a consistency substantially the same as common household modeling clay. It has been found that a sealant of such properties has the ability to receive a mating flange of a filter housing and effect a seal therebetween in the manner described above, and while also permitting the filter to be subsequently removed from the housing with the flange being withdrawn from the sealant without an appreciable amount of the sealant adhering to the flange. Thus any contaminants present in the sealant will be removed with the filter and will not remain in the housing.

In one preferred embodiment, the sealant 30 comprises an uncured polysiloxane gum having a viscosity of at least about 500,000 centipoise, and a molecular weight of at least about 300,000 a m u. Also, the polysiloxane gum preferably includes no more than about three percent volatiles, and has a plasticity of about 150–170 Williams. As a specific non-limiting example, a compounded uncured dimethyl polysiloxane gum which is sold by the General Electric Company under the product identification SE-32, and which has the following properties, has been found to be particularly suitable:

Color: Off White.
Specific Gravity: 1.15+ or −0.05.
Percent Volatiles: 3% maximum.
Plasticity: 150–170 (Williams).
Molecular weight: 300,000 a m u.
Viscosity: 639,000 centipoise.

The above described dimethyl polysiloxane gum sealant possesses a number of properties which permit realization of the stated objects of the invention, as well as other advantages. In particular, and as noted above, the sealant is able to provide an effective seal with the embedded flange, which is effective under a high pressure differential of up to 40 inches of water. The sealant does not appreciably dry or crack in view of its low percentage of volatiles, and it does not wick into a wood fiberboard filter frame. Still further, the sealant may be readily extruded into a desired shape for assembly into the channel of the filter, and significantly, it is self amalgamating which permits the butted ends of an extruded strip to bond to each other in the manner further described below. Still further, the described sealant readily accepts a fire retardant material and other fillers, and finally, the sealant has good adhesion characteristics to either a metal, plastic, or fiberboard frame, so that the sealant will be retained in the channel without the need for a glue or other anchor.

As indicated above, various fillers may be added to the gum resin to provide desirable properties, such as fire retardancy, heat resistance, or improved tensile strength. As a further non-limiting specific example wherein such fillers are employed, the following composition is suitable for use in fabricating the sealant:

50 parts uncured dimethyl polysiloxane gum (General Electric SE-32)
50 parts uncured methyl vinyl polysiloxane gum (General Electric SE-63)
12 parts fumed silica
5 parts red iron oxide
10 parts decabromodiphenyloxide (Great Lakes Chemical DE83R).

In the above example, the fumed silica acts to increase tensile strength, the iron oxide increases heat resistance, and the phenyloxide is a fire retardant which permits the sealant to meet UL test standard UL 94 V-O, which requires the sealant to be self-extinguishing when exposed to a flame.

FIGS. 5–7 illustrate the steps of a method for fabricating a filter of the described construction. In this regard, it will be understood that the filter pack and frame are initially assembled in the conventional manner, with the frame including a peripheral channel. As illustrated, the frame is fabricated from a metallic material, such as stainless steel, but as noted above, it may alternatively be fabricated from plastic or wood fiberboard.

The sealant 30 is extruded into an elongate strip 30a, which is preferably wound into a flat coil to facilitate handling and storage as seen in FIG. 5. The strip 30a includes a sheet of release paper 31 or the like adhered to one side edge of the strip, with the release sheet 31 being disposed between adjacent coils to prevent contact between the adjacent coils. Also, the strip 30a is extruded to have a cross sectional size which generally conforms to the cross sectional size and shape of the channel 26 into which it is to be placed. The strip 30a is then progressively disposed in the channel 26, while the release sheet 31 is stripped therefrom as seen in FIG. 5, The strip 30a is cut to length so that the trailing end of the strip abuts the front end of the strip in the channel. Surprisingly, the abutting ends of the polysiloxane sealant will in a short time self amalgamate or diffuse into each other, resulting in a continuous uninterrupted joint which has the same appearance and characteristics of the remaining portions of the strip. Thus any possibility of leakage through the joint formed between the ends of the strip is avoided. FIG. 8 illustrates an alternative procedure for removing the release sheet 31, and wherein the release sheet is withdrawn from the extruded strip after the strip is completely positioned in the channel.

While the present invention has been illustrated in association with a large framework comprising a number of filters in a bank, it will be understood that the invention is also applicable for use in association with conventional box-like housings which support one, two, or other small number of filters in an air duct system. Also, while there has been set forth a preferred embodiment of the invention wherein the channel is formed as part of the filter frame, it will be understood that the invention is equally applicable to a filter housing arrangement wherein the channel is part of the housing, and the mating flange is fixed to the filter, as illustrated in commonly owned U.S. Pat. No. 3,486,311, the disclosure of which is incorporated herein by reference. An embodiment of this construction is also illustrated in FIG. 11 which discloses a housing in the form of a horizontally disposed latticework 50 of interconnected U-shaped channels for supporting a bank of filters. The U-shaped channels of the latticework define a plurality of openings 51 adapted to form a part of an air flow system having an airstream passing vertically therethrough. The sealant 30 is positioned in the U-shaped channels of the latticework, and the filters 16a each include a peripheral depending skirt or flange 52 which is adapted to be received in the channels and embedded in the sealant in the manner shown in FIG. 12.

While specific terms have been employed to describe the invention, it will be understood that the terms are used in a generic and descriptive sense only, and not for purposes of limitation.

That which is claimed is:
1. A high efficiency particular air filter comprising a frame having a centrally disposed air flow opening therethrough, and including a continuous peripheral channel adjacent one end thereof, with said channel facing in a direction parallel to said air flow opening.

a filter pack sealably disposed within said frame and filling said air flow opening through said frame, said filter pack comprising a high efficiency particulate air filtering medium, and a sealant disposed in said channel, said sealant comprising an essentially non-volatile and non-hardening moldable gum-like uncured polysiloxane gum having a viscosity of at least about 500,000 centipoise, and whereby the filter is adapted to be sealed in a housing having a flange conforming to the channel by embedding the flange in the sealant, and the filter can be subsequently removed from the housing with the flange being withdrawn from the sealant without an appreciable amount of the sealant adhering to the flange.

2. The high efficiency particulate air filter as defined in claim 1 wherein said sealant includes dimethyl polysiloxane gum.

3. The high efficiency particulate air filter as defined in claim 2 wherein said sealant includes no more than about 3% volatiles, and has a plasticity of about 150–170 Williams.

4. The high efficiency particulate air filter as defined in claim 1 wherein said sealant comprises a substantially uniform and continuous closed strip which is characterized by the absence of a butt end joint.

5. An apparatus for filtering an airstream and comprising a high efficiency particulate air filter comprising a frame having a centrally disposed air flow opening therethrough, said frame including a continuous peripheral channel adjacent one end thereof, with said channel facing in a direction parallel to said air flow opening; a filter pack sealably disposed with said frame and filling said air flow opening through said frame, said filter pack comprising a sheet of high efficiency particulate air filtering medium folded upon itself in accordion fashion; and a sealant filling at least a substantial portion of said channel, said sealant comprising an essentially non-volatile and non-hardening gum-like uncured high molecular weight polysiloxane gum having a viscosity of at least about 500,000 centipoise, and a housing adapted to form a pair of an air flow system having an airstream passing therethrough, said housing including filter support means mounting said filter therein, with said filter support means including a flange having a forward portion and a continuous cross sectional outline corresponding to that of said channel and with the forward portion of said flange being positioned within said channel and sealably embedded into said sealant to thereby effect an air seal between said filter frame and said filter support means, and whereby the filter can be subsequently removed from the housing with the flange being withdrawn from the sealant without an appreciable amount of the sealant adhering to the flange.

6. The high efficiency particulate air filter as defined in claim 5 wherein said sealant has a molecular weight of at least about 300,000 a m u.

7. An apparatus for filtering an airstream and comprising a supporting housing having an opening adapted to form a part of an air flow system having an airstream passing therethrough to define an air flow direction through said opening, a high efficiency air filter supported by said housing, and means for releasably sealing the periphery of said air filter to the periphery of said housing opening so as to permit the filter to be withdrawn from the housing and replaced with a fresh filter, the improvement wherein said sealing means comprises a continuous peripheral channel surrounding said opening and sealably fixed to one of either said housing or said filter, said channel facing in a direction parallel to the air flow direction through said opening, a sealant filling at least a substantial portion of said channel, said sealant comprising an essentially non-volatile and non-hardening gum-like uncured polysiloxane gum having a viscosity of at least about 500,000 centipoise and having a consistency substantially the same as modeling clay, and a flange having a continuous cross sectional outline corresponding to that of said channel, said flange being sealably fixed to the other of either said housing or said filter and having a forward edge portion positioned within said channel and sealably embedded into said sealant.

8. The apparatus as defined in claim 7 wherein said sealant includes a fire retardant in sufficient amount to cause the sealant to be self-extinguishing when exposed to a flame.

* * * * *